Jan. 19, 1960  J. C. McGREGOR  2,921,655
MEANS FOR RETAINING BOLTS IN POSITION DURING ASSEMBLY
Filed Sept. 9, 1957
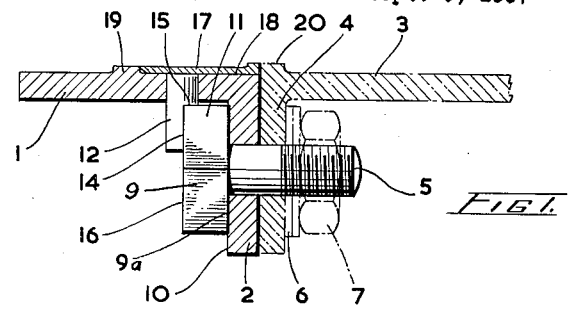
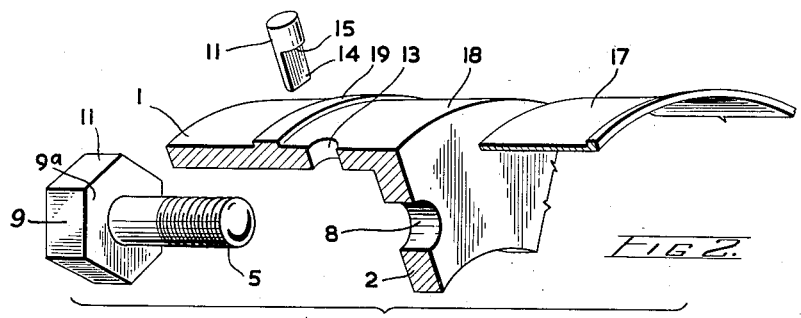
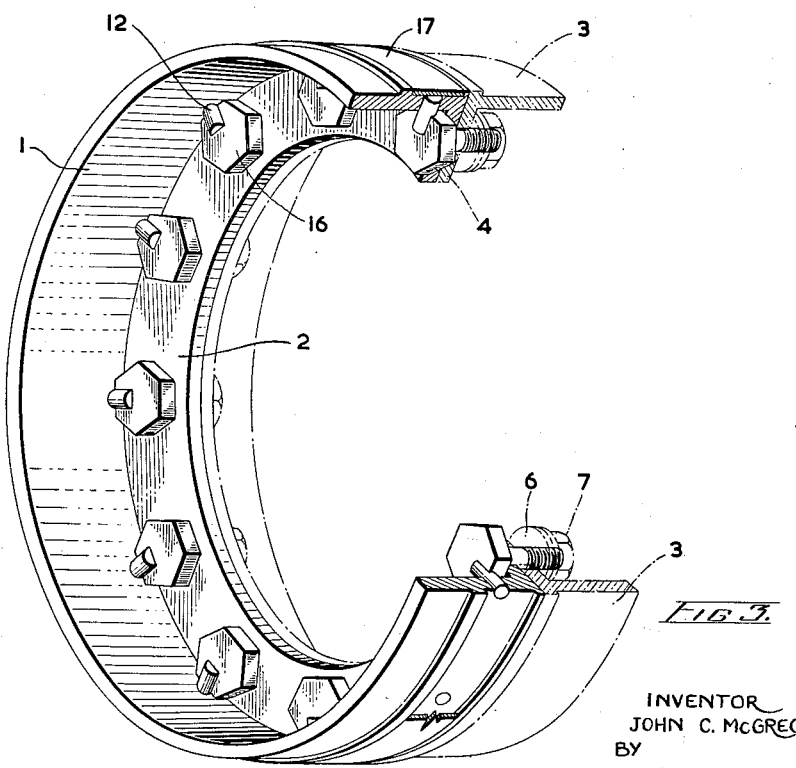
INVENTOR
JOHN C. McGREGOR
BY
Maybee & Legris
ATTORNEYS.

2,921,655

MEANS FOR RETAINING BOLTS IN POSITION DURING ASSEMBLY

John Cameron McGregor, Oakville, Ontario, Canada, assignor to Orenda Engines Limited, Malton, Ontario, Canada, a corporation Application September 9, 1957, Serial No. 682,950

2 Claims. (Cl. 189—36)

This invention relates to means for retaining bolts in position during the assembly of two bodies.

This invention is of particular use during the assembly of gas turbine engines where access is not readily available to the insides of such parts as compressor and turbine castings, and annular combustion chambers.

In the drawings:

Figure 1 is a fragmentary section view showing the bolt holding means in use; one of the mating bodies being shown in phantom lines;

Figure 2 is an exploded fragmentary perspective view showing the parts in line for assembly;

Figure 3 is a fragmentary perspective view.

In the drawings, reference numbers in the different views refer to corresponding parts.

The drawings show a cylindrical body having a wall 1 and a flange 2 joined to another cylindrical body, shown in phantom lines, having a wall 3 and a flange 4, by means of bolts 5 which have hexagonal heads, washers 6, and hexagonal nuts 7.

The bolts 5 pass through holes 8 in the flange 2 with the inner faces 9a of their heads 9 engaging the inner surface 10 of the flange 2.

Dowels 12 pass through holes 13 in the body wall 1. The holes 13 are arranged so that the axis of each hole 13 will intersect with the axis of its adjacent hole 8 in the flange 2. Each of the dowels 12 has a step consisting of an axial plane surface 14 and a shoulder 15. The axial plane surface 14 extends from the radially inner end of the dowel 12 when the dowel is in the position shown in Figures 1 and 3 and engages the outer surface 16 of the bolt head 9 in order to retain the bolt in the hole 8 against axial displacement. The shoulder 15 of the dowel 12 engages the side 11 of the bolt head in order to limit dowel movement in a radially inward direction.

A circular band 17 surrounds the body wall 1 and engages the radially outer ends of the dowels 12 and thus prevents radially outwardly movement of the dowels. The band 17 is held against axial movement on surface 18 of the body wall 1 by a retaining bead 19 on the body wall 1 and a bead 20 on the wall 3 of the other cylindrical body.

What I claim as my invention is:

1. In a cylindrical body having a cylindrical wall, an internal flange extending from the wall at right angles thereto, the flange having a circumferentially spaced series of first holes extending therethrough in a direction parallel to the wall, a headed bolt passing through each hole with one face of its head in abutment with one side of the flange; means for retaining each bolt in position comprising a second hole passing through the wall of the body spaced from the flange and on the same side of the flange as the bolt head, the axis of the second hole intersecting the axis of the first hole at right angles, a dowel in the hole, the dowel being of a length greater than the distance from the side of the wall remote from the bolt head to the adjacent edge of the bolt head but less than the distance to the remote edge of the bolt head, the dowel having a step cut therein and defined by an axially aligned plane surface intersecting with a radially aligned plane surface, the axially aligned plane surface being in abutment with that face of the bolt head remote from the face in abutment with the flange and the radially aligned plane surface being in abutment with the edge of the bolt head, and a band overlying the second hole in the body and bearing on the dowel to hold it in engagement with the bolt head and to restrain movement of the dowel away from the bolt head.

2. Structure as claimed in claim 1 in which the axis of the second hole is on a radius of the cylindrical wall.

References Cited in the file of this patent

UNITED STATES PATENTS

| | | |
|---|---|---|
| 821,297 | Kohler | May 22, 1906 |
| 824,526 | Coffin | June 26, 1906 |
| 2,189,644 | Wingard | Feb. 6, 1940 |
| 2,369,410 | Rossman | Feb. 13, 1945 |
| 2,672,848 | Brill | Mar. 23, 1954 |
| 2,757,025 | Noyes et al. | July 31, 1956 |